United States Patent [19]

Smith et al.

[11] Patent Number: 4,523,391
[45] Date of Patent: Jun. 18, 1985

[54] HIGH EFFICIENCY IMPINGEMENT HEATING AND COOLING APPARATUS

[75] Inventors: Donald P. Smith, 4530 Woodfin Dr., Dallas, Tex. 75220; William W. Plumb, Dallas, Tex.

[73] Assignee: Donald P. Smith, Dallas, Tex.

[21] Appl. No.: 424,595

[22] Filed: Sep. 27, 1982

[51] Int. Cl.³ ............................................. F26B 15/18
[52] U.S. Cl. ..................................... 34/225; 34/231; 34/155; 34/156; 34/160
[58] Field of Search ................. 34/155, 156, 160, 225, 34/233, 231, 224, 232; 99/483; 126/21 A

[56] References Cited

U.S. PATENT DOCUMENTS

| Re. 24,871 | 9/1960 | Parkes | 34/156 |
| 3,964,656 | 6/1976 | Hella | 34/156 |
| 4,154,861 | 5/1979 | Smith | 99/447 |
| 4,204,340 | 5/1980 | Doucin et al. | 34/225 |

FOREIGN PATENT DOCUMENTS

| 1074515 | 10/1954 | France | 34/160 |
| 515270 | 2/1955 | Italy | 34/156 |

Primary Examiner—Larry I. Schwartz
Attorney, Agent, or Firm—Crutsinger, Booth & Ross

[57] ABSTRACT

Apparatus for thermally treating food products by impingement heating or cooling, comprising a plenum having a plurality of inwardly inclined front wall panels adapted to direct the flow of a temperature-controlled gas through at least one elongated plenum outlet port in fluid communication with a duct assembly comprising an elongated manifold coextensive with the elongated plenum outlet port and providing substantially unobstructed fluid communication between the elongated plenum outlet port and a plurality of tapered ducts having at least two inwardly inclined walls, including at least one inwardly inclined side wall.

9 Claims, 6 Drawing Figures

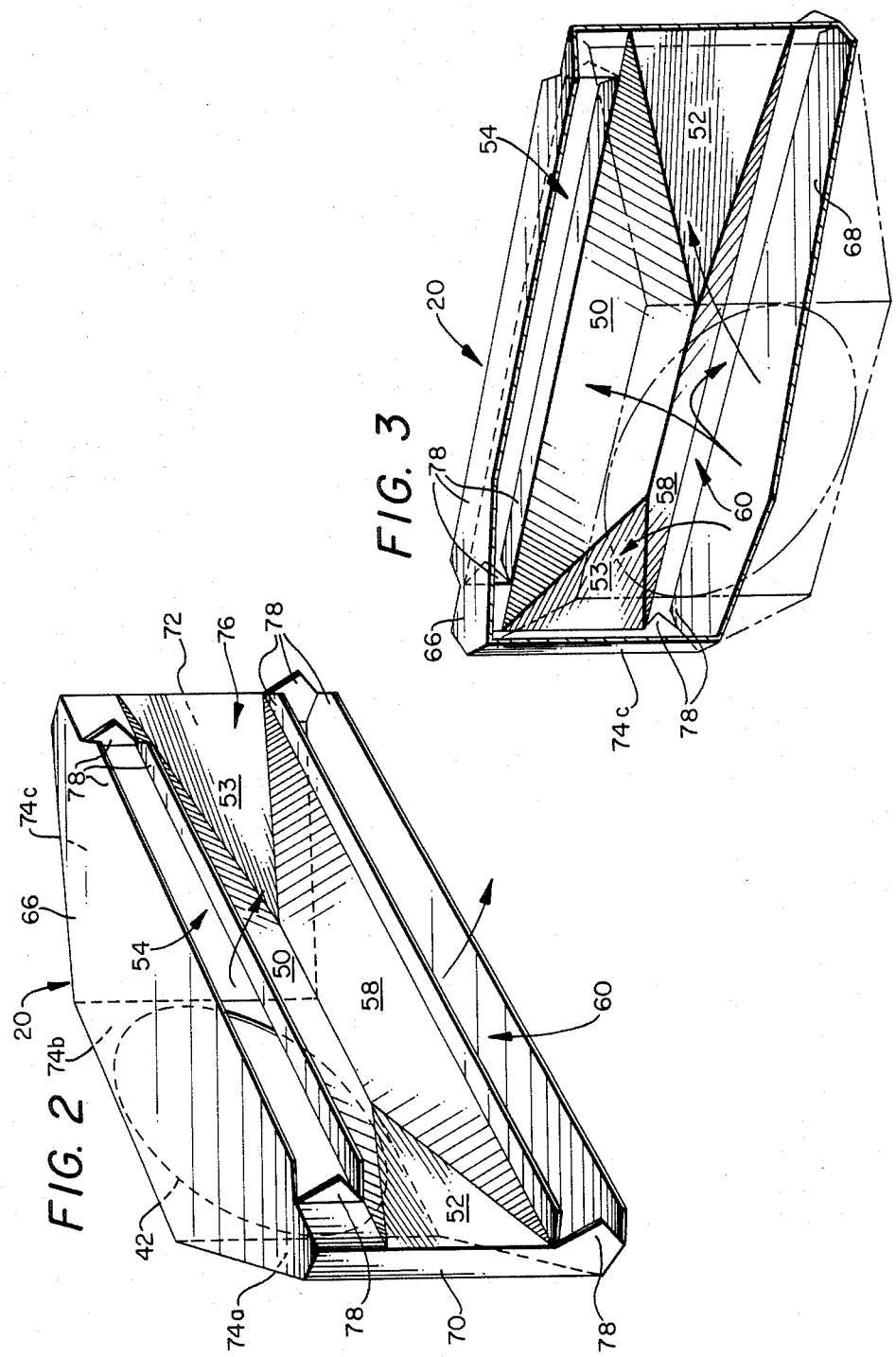

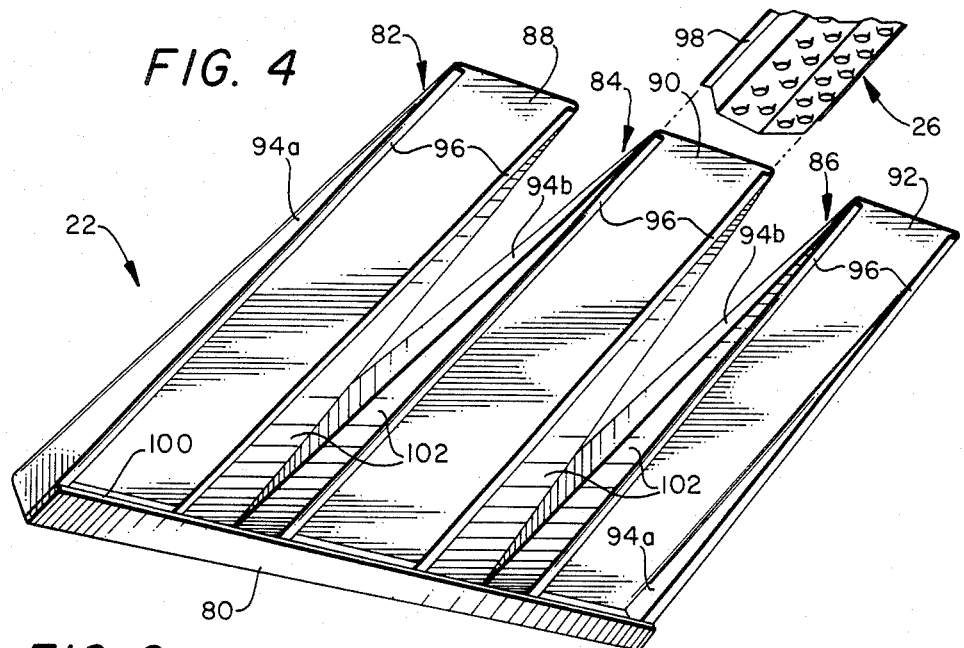
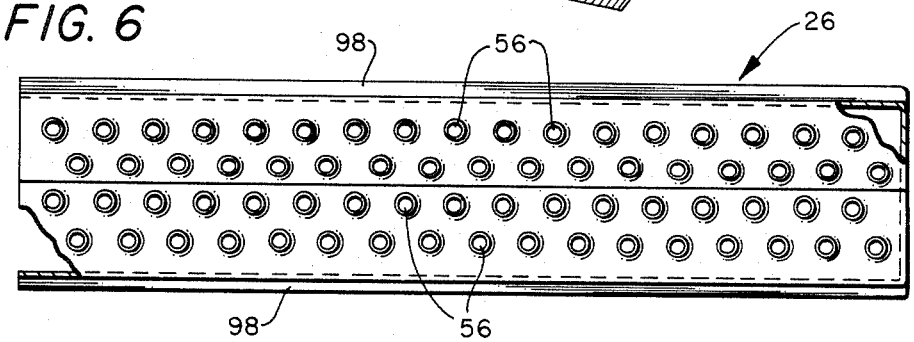
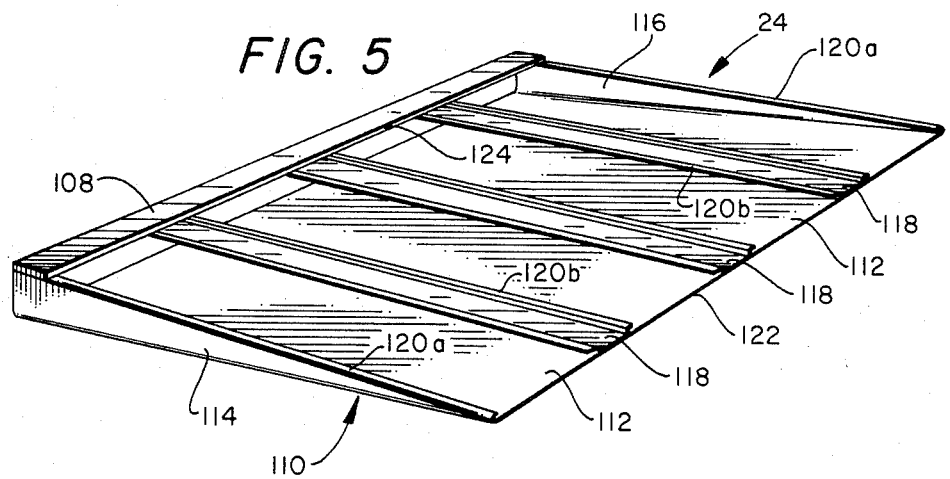

HIGH EFFICIENCY IMPINGEMENT HEATING AND COOLING APPARATUS

TECHNICAL FIELD

This invention relates to apparatus which utilizes high velocity streams of temperature-controlled gas to transfer thermal energy either into or out of food products. One aspect of the invention relates to an improved plenum and duct design for use in directing high velocity streams of gas from a blower to the surface of the food products. A further aspect of the invention relates to apparatus for achieving more even flow distribution and less turbulence than has previously been attained with the use of conventional, commercially available equipment.

BACKGROUND OF THE INVENTION

The use of impingement heating apparatus for thermally treating food products has previously been disclosed. These conventional apparatus typically employ columnated jets of temperature-controlled gas which impinge against the surface of a food product moving relative thereto. Such devices are disclosed, for example, in U.S. Pat. Nos. 3,884,213; 4,154,861; 4,289,792; and 4,338,911. When used for heating purposes, these devices can also be employed in combination with microwave generators.

In conventional conveyorized ovens which utilize impingement heating, high velocity jets of a temperature-controlled gas are directed against the surface of food products transported through the apparatus on a conveyor. The temperature-controlled gas is discharged by a blower into a plenum that directs the flow of gas into a series of spaced-apart tapered ducts extending transversely across the conveyor. These ducts are in turn adapted to direct the flow of gas into columnating orifices which cause the gas jets to impinge against the surface of the food products.

In the past, those working with such ovens have encountered difficulty in balancing the gas flow across the plenum and into the various ducts, especially those farthest removed from the point at which the gas is discharged from the blower. Plenums utilized in the conventional, commercially available impingement ovens have generally employed a substantially vertical, planar front wall having a plurality of spaced apart, rectangular ports disposed therein for providing fluid communication with the outwardly extending ducts. The blower is typically disposed inside a shroud at the rear of the plenum. Attempts have previously been made to balance the flow of gas into the ducts farthest removed from the blower by tapering the rear wall of the plenum toward the front wall as it extends laterally outward from the blower. Attempts have also been made to balance the flow within the ducts by tapering the wall opposite the columnating orifices. However, even when the plenum and ducts are designed and constructed in this manner, the gas entering the inlet ports of the remote ducts is likely to overshoot the columnating orifices nearest the inlet ports. Also, it has been found that the flat surfaces between the inlet ports on the front wall of the plenum cause turbulence which further disrupts the flow of gas and hinders the even distribution of the gas to adjacent ducts.

In view of these and other disadvantages that have been encountered in using the conventional, commercially available devices, an improved apparatus is needed that will facilitate even distribution of the gas throughout a plurality of ducts while simultaneously reducing the overall turbulence inside the plenum.

SUMMARY OF THE INVENTION

According to the present invention, an impingement heating and cooling apparatus is provided which comprises a novel plenum and duct design adapated to significantly improve the distribution and flow of a temperature-controlled gas within the apparatus.

According to a primary object of the invention, a novel plenum is provided that significantly improves the distribution of a temperature-controlled gas from a blower disposed at the rear of the plenum to a plurality of outwardly extending ducts in fluid communication therewith. The front wall of the subject plenum is adapted by means of at least one elongated, continuous outlet port to provide fluid communication with a duct assembly further comprising an elongated manifold having a plurality of tapered ducts extending outwardly therefrom. According to a preferred embodiment of the invention, elongated rectangular outlet ports are disposed along both the top and bottom edges of the front wall of the plenum so as to facilitate impingement heating or cooling of both the top and bottom surfaces of a food product.

According to another object of the invention, that portion of the front wall of the plenum between the elongated upper and lower outlet ports is preferably non-planar, and is adapted by means of a plurality of inclined wall sections joined along weld or fold lines to direct the flow of temperature-controlled gas being discharged by the blower outwardly in all directions from the midpoint of the front wall.

According to a further object of the invention, novel duct members are provided to facilitate fluid communication between the plenum of the invention and a plurality of columnating orifices which form the discrete jets of temperature-controlled gas that impinge against the surface of the food product. In a preferred embodiment of the invention, the novel duct members comprise at least two inwardly inclined walls, including at least one inwardly inclined side wall.

BRIEF DESCRIPTION OF THE DRAWINGS

The invention is explained in further detail with reference to the accompanying drawings wherein:

FIG. 2 depicts a front perspective view of the novel plenum of the invention;

FIG. 3 depicts a rear perspective view, partially in section, of the novel plenum of the invention;

FIG. 4 depicts a front perspective view of the upper duct assembly of the invention;

FIG. 5 depicts a perspective view of the lower duct assembly of the invention; and FIG. 6 depicts a plan view, partially broken away, of a columnating plate suitable for use with the upper and lower duct assemblies of the invention.

Numeral references are employed to designate like parts throughout the various figures of the drawing.

DESCRIPTION OF A PREFERRED EMBODIMENT

Figure 1:
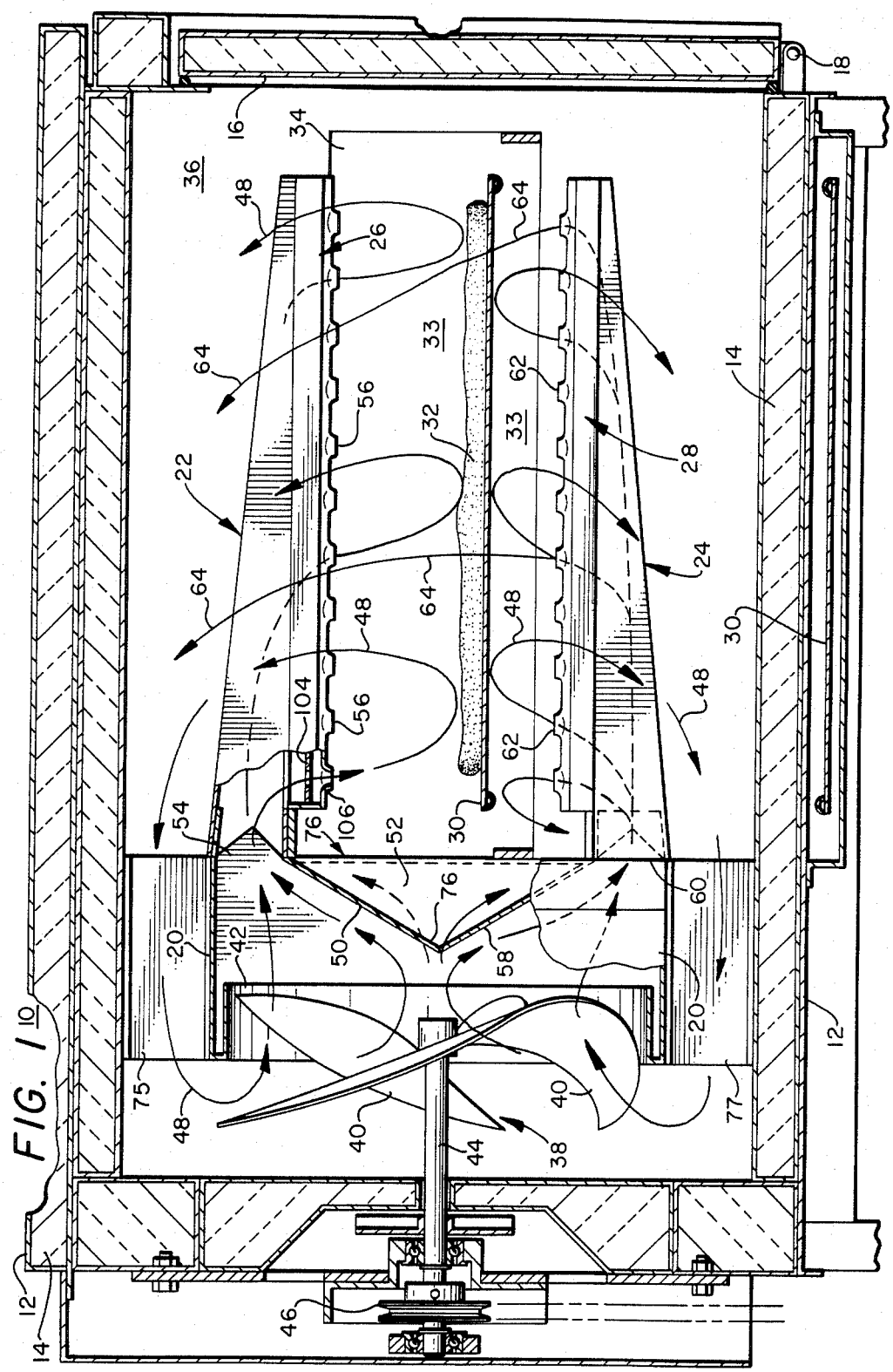
FIG. 1 depicts a sectional side elevation view of the apparatus of the invention.

Referring to FIG. 1, thermal treatment apparatus 10 of the invention preferably comprises cabinet 12 having top, bottom, front, back and end walls further comprising interior and exterior wall panels having insulating material 14 disposed therein. According to one embodiment of the invention, the interior and exterior wall panels of cabinet 12 are fabricated from a metallic sheet material such as stainless steel. According to a preferred embodiment of the invention, the front wall portion of cabinet 12 further comprises door 16 which is pivotally connected by means of hinge 18 to permit easy access to the interior portion of thermal treatement apparatus 10.

Disposed within cabinet 12 of thermal treatment apparatus 10 are plenum 20, upper duct assembly 22, lower duct assembly 24, upper columnating jet assembly 26, lower columnating jet assembly 28, and conveyor 30 for supporting food products 32. The thermal treatment zone 33 for food products 32 is defined as that space above and below conveyor 30 which lies beneath upper columnating jet assembly 26 and above lower columnating assembly 28. Aperture 34 in distal end wall 36 and a corresponding aperture in the proximal end wall (not shown) permit food products 32 to be continuously transported through cabinet 12 by conveyor 30.

According to a preferred embodiment of the invention, blower 38 is rotatably mounted in the rear wall of cabinet 12 in such manner that impeller 40 is disposed within shroud 42 at the rear of plenum 20. Blower 38 further comprises shaft 44, which can be belt-driven by pulley 46 as shown or by a direct motor drive if desired.

Arrows 48, 64 depict the flow of the temperature-controlled gas, preferably air, which is recirculated within cabinet 12 of thermal treatment apparatus 10. Upon being discharged by impeller 40 of blower 38, the gas is directed by the walls of plenum 20 through elongated plenum outlet ports 54, 60 into upper and lower duct assemblies 22, 24, respectively. The temperature-controlled gas is thereafter directed through orifices 56, 62 in upper and lower columnating jet assemblies 26, 28, respectively, so as to form discrete high velocity jets which impinge against the surface of food products 32. After impinging against food products 32, the gas jets are deflected back around upper and lower duct assemblies 22, 24 and are drawn behind plenum 20 to the intake side of shroud 42 of plenum 20. Where, as in the preferred embodiment disclosed herein, upper columnating jet assembly 26 and lower columnating jet assembly 28 are offset and not directly opposed, some gas may also return to the inlet side of shroud 42 by passing upward between the individual ducts of upper duct assembly 22 and behind plenum 20 as shown by arrows 64. The flow pattern exhibited by arrow 64 is most likely to occur where lower duct assembly 24 is of the type shown in FIG. 5, as is further explained below. The tendency of gas discharged from orifices 62 to return via the path of arrow 64 further depends upon the dimensions and spacing of food products 32 being transported by conveyor 30.

The design and construction of plenum 20, including upper and lower elongated plenum outlet ports 54, 60, are further described below in relation to FIGS. 2 and 3. The design and construction of upper duct assembly 22 are further described in relation to FIG. 4; lower duct assembly 24 is further described in relation to FIG. 5; and columnating jet assemblies 26, 28 are further described in relation to FIG. 6.

Referring to FIGS. 2 and 3, plenum 20 preferably further comprises top wall 66, bottom wall 68, proximal and distal end walls 70, 72, back wall 74a, b, c, and front wall 76. Plenum 20 is preferably constructed of sheet metal such as, for example, stainless steel. According to a preferred embodiment, top wall 66 and bottom wall 68 are preferably substantially horizontal, and are connected to the top and bottom interior wall panels of cabinet 12 by brackets 75, 77, respectively. For some applications, it may be desirable for top wall 66 to be upwardly inclined between back wall 74a, b, c and front wall 76, and for bottom wall 68 to be downwardly inclined between back wall 74a, b, c and front wall 76. Back wall 74b of plenum 20 is preferably adapted by means of shroud 42 to receive impeller 40 of blower 38, as shown in FIG. 1. Shroud 42 also serves as an inlet port for the temperature-controlled gas that is recirculated through plenum 20 by blower 38. According to the preferred embodiment shown in FIGS. 2 and 3, back wall section 74b is parallel to the longitudinal axis of conveyor 30 and perpendicular to the plane of conveyor 30 on which food products 32 are supported. Back wall 74 further comprises outwardly disposed, substantially vertical, forward extending back wall sections 74a, 74c which connect centrally disposed back wall portion 74b with proximal and distal end walls 70, 72, respectively. In accordance with the invention disclosed herein, plenum 20 preferably further comprises a novel front wall 76 having elongated, substantially rectangular plenum outlet ports 54, 60 disposed adjacent to the top and bottom edges, respectively, thereof.

As shown in FIGS. 2 and 3, outwardly extending flanges 78 are provided along the top, bottom and side edges of elongated plenum outlet ports 54, 60 for engaging upper and lower duct assemblies 22, 24, respectively, as shown in FIG. 1. The perimeter of front wall 76 of plenum 20 preferably defines a substantially vertical planar segment that is parallel to back wall section 74b. According to a particularly preferred embodiment of the invention, that portion of front wall 76 extending from proximal end wall 70 to distal end wall 72 between upper and lower elongated plenum outlet ports 54, 60 is inwardly inclined into plenum 20 from the plane defined by the perimeter of front wall 76. Thus, front wall 76 of plenum 20 further comprises upper and lower inclined front wall sections 50, 58, respectively, and proximal and distal side inclined front wall sections 52, 53, respectively. Each of wall sections 50, 52, 53, 58 is desirably substantially planar, and when joined as shown in FIGS. 1-3, the sections coact to direct the flow of temperature-controlled gas discharged by impeller 40 outwardly in all directions from the midpoint of front wall 76, thus providing improved flow distribution into upper and lower plenum outlet ports 54, 60. As will be apparent to those of ordinary skill in the art, the lines of intersection between front wall sections 50, 52, 53, 58 as shown in FIGS. 2 and 3 can either be fold lines or welds, and in most cases, will probably comprise a combination of fold lines and welds.

When constructed as shown in FIGS. 1-3, plenum 20 is adapted to direct the flow of temperature-controlled gas discharged by blower 38 through elongated plenum outlet ports 54, 60 with minimal turbulence and in such manner that the flow is substantially evenly distributed across the length of the ports. By adjusting the degree to which wall portions 50, 58 are inwardly inclined, it is possible to further affect the manner in which the flow of temperature-controlled gas is distributed across upper and lower plenum outlet ports 54, 60. Similarly, the division of flow between upper and lower plenum outlet ports 54, 60 can also be adjusted by varying the elevation of the line of intersection therebetween. Thus, if wall sections 50, 58 are constructed so that the elevation of their line of intersection is above the elevation of shaft 44 of blower 38, more of the temperature-controlled gas will be diverted through lower plenum outlet ports 60 and into lower duct assembly 24. Conversely, if the elevation of the line of intersection is below the elevation of shaft 44, a greater percentage of the temperature-controlled gas will be deflected by front wall 76 of plenum 20 through upper plenum outlet port 54 into upper duct assembly 22.

Upper duct assembly 22 is described in more detail in relation to FIG. 4. Referring to FIG. 4, upper duct assembly 22 preferably comprises an elongated, substantially rectangular, continuous manifold 80 having a plurality of outwardly extending, elongated duct members 82, 84, 86 connected thereto. According to a preferred embodiment of the invention, duct members 82, 84, 86 are constructed from the same metallic sheet material as plenum 20, and can be connected to manifold 80 by welding or by any suitable method. According to a particularly preferred embodiment of the invention, manifold 80 of upper duct assembly 22 is adapted to slidably engage the outwardly extending flange portions 78 along upper plenum outlet port 54.

As shown in FIG. 4, each of duct members 82, 84, 86 further comprises a downwardly inclined, substantially planar top wall 88, 90, 92 and substantially vertical side walls, including exterior side walls 94a and interior side walls 94b. The lower edges of exterior and interior side walls 94a, 94b are substantially horizontal, and are parallel to the plane defined by conveyor 30 on which food products 32 are supported, as shown in FIG. 1. The top edges of side walls 94a, 94b are desirably downwardly inclined from manifold 80 at the same angle of inclination as top walls 88, 90, 92 of duct members 82, 84, 86, respectively. Adjacent interior side walls 94b desirably intersect in a vertical line of intersection and are joined such as by welding or the like at the point where duct members 82, 84, 86 begin extending outwardly from manifold 80 of upper duct assembly 22.

Each of duct members 82, 84, 86 preferably further comprises two flanges 96 which extend perpendicularly outward from manifold 80 so as to define a plane that is parallel to the plane of conveyor 30 when upper duct assembly 22 is installed as shown in FIG. 1. Flanges 96 are adapted to receive and provide sliding engagement with cooperating flanges 98 of upper columnating jet assembly 26, as shown in FIG. 6. Flanges 96 cooperate with the lower forward edge of manifold 80 and the forward edge of top walls 88, 90, 92 to define substantially horizontal, rectangular apertures in the bottom of ducts 82, 84, 86 for providing fluid communication between elongated outlet port 54 of plenum 20 and upper columnating jet assembly 26. Because adjacent interior side walls 94b are not parallel to flanges 96, triangular web sections 102 are needed to interconnect the bottom edges of interior side walls 94b with the nearest adjacent flange 96.

When constructed in the manner described above, both the height and the width of the interior portions of duct members 82, 84, 86 decrease with increasing distance from manifold 80. With a duct assembly 22 as shown in FIG. 4, the combined cross sectional inlet area of duct members 82, 84, 86 is substantially the same as the total cross sectional area of elongated plenum outlet port 54, as shown in FIG. 2. This feature represents a significant departure from the plenum and duct designs previously employed in conventional impingement heating and cooling devices. With the conventional plenum and duct designs, spaced apart plenum outlet ports were separated by flat, substantially perpendicular wall portions which caused undesirable turbulence and impeded the flow of gas into the adjacent ducts. With the design disclosed herein, however, the entrances to adjacent ducts are separated only by the narrow line of intersection of the interior side walls of adjacent ducts. Moreover, because the cross sectional area at the entrance to the ducts is significantly larger, the temperature-controlled gas enters the respective ducts at a lower velocity and is less likely to overshoot the columnating orifices 56 disposed nearest the plenum outlet port 54. The tapered interior side walls 94b of duct members 82, 84, 86 greatly assist in balancing the flow distribution between adjacent ducts, as well as in balancing the flow distribution through the plurality of columnating orifices 56 in upper columnating jet assembly 26. Use of the duct members disclosed herein also permits some reduction in the overall height of thermal treatment apparatus 10 by taking advantage of the previously unused space between adjacent duct members to increase the cross sectional area at the entrance to each duct.

As shown in FIGS. 1, 4 and 6, columnating jet assemblies 26, 28 are preferably adapted by means of flanges 98 to slidably engage corresponding flanges 96 of each duct member 82, 84, 86 of upper duct assembly 22. Referring to FIG. 1, upper columnating jet assembly 28 preferably comprises columnating plate 104 and orifice plate 106 in parallel and spaced apart relation to each other. Columnating plate 104 and orifice plate 106 each preferably comprise a plurality of substantially concentrically aligned orifices adapted to columnate the high velocity streams of temperature-controlled gas flowing into discrete jets which are then directed against the surface of food products 32. Such columnating jet assemblies have been previously disclosed and are described for example, in U.S. Pat. No. 4,338,911. As will be apparent to those of skill in the art, columnating assembly 28 can also comprise a single orifice plate having a plurality of vertical tubular columnating members disposed therein for forming the discrete gas jets.

Upper duct assembly 22 is particularly preferred for use in applications where a plurality of spaced apart ducts are desired. Although this design has been disclosed herein for use as the upper duct assembly of thermal treatment apparatus 10, will be understood and appreciated upon reading this disclosure that the same or a similar duct assembly can also be utilized as the lower duct assembly if desired.

An alternative duct design suitable for use in the apparatus of the present invention is shown in FIG. 5. This embodiment is preferred for use in applications where it is desired that the surface of food products 32 be continuously subjected to impinging jets of temperature-controlled gas from either above or below conveyor 30. Referring to FIG. 5, lower duct assembly 24 preferably comprises an elongated, substantially rectangular manifold 108 that is adapted to slidably engage flanges 78 of lower plenum outlet ports 60, thereby providing fluid communication between the interior of plenum 20 and the interior of lower duct assembly 24. Unlike upper duct assembly 22, lower duct assembly 24 comprises a single duct member 110 whose proximal and distal ends are coterminous with the proximal and distal ends of manifold 108 and elongated plenum outlet port 60. Duct member 110 further comprises bottom wall 112, end walls 114, 116, flange support members 118 and flanges 120a,b. End walls 114, 116 are preferably substantially vertical with respect to the plane of conveyor 30 and extend perpendicularly outward from manifold 108. When viewed from the end of lower duct assembly 24, end walls 114, 116 are preferably triangularly shaped, with their top edges lying in a horizontal plane at substantially the same elevation as the top interior portion of manifold 108. The bottom edges of end wall 114, 116 are preferably upwardly inclined from the bottom of manifold 108 so as to intersect the top edges of end walls 114, 116, respectively, at their outermost points. Bottom wall 112 of lower duct assembly 24 preferably comprises an upwardly inclined, continuous metal sheet that extends between and is connected to the bottom edges of end walls 114, 116. According to a preferred embodiment of the invention, the upper surface of bottom wall 112 also serves as the bottom interior surface of manifold 108. Forward edge 122 of bottom wall 112 cooperates with top forward edge 124 of manifold 108 and the top edges of end walls 114, 116 to define a substantially horizontal, rectangular opening providing fluid communication between manifold 108 and a plurality of lower columnating jet assemblies 28. A plurality of flange support members 118 are desirably employed for maintaining lower columnating jet assemblies 28 in their desired positional alignment to duct 110. Flange support members 118 are preferably connected to and extend perpendicularly outward from the top wall of manifold 108. The forward edges of flange support members 118 are preferably coterminous with and connected to front edge 122 of bottom wall 112. Flange support members 118 are further adapted by means of flanges 120b to receive and slidably engage cooperating flanges disposed along the lower edges of lower columnating jet assemblies 28. Flanges 128 are similarly disposed along the top edges of end walls 114, 116 to assist in slidably engaging the outermost columnating jet assemblies. Lower columnating jet assemblies 28 suitable for use with lower duct assembly 24 are designed and constructed as previously described in relation to FIG. 6 and upper columnating jet assemblies 26. In either case, the arrangement and spacing of the orifices in the columnating jet assemblies is preferably such that the spent air which is deflected after impinging on the surface of food products 32 is provided with a path by which it can return to the inlet side of plenum 20 without "washing out" the impingement action of the adjacent jets.

As used herein, the term "temperature-controlled gas" refers to any substantially gaseous fluid having an energy level that is adequate to establish a thermal energy gradient relative to the surface of food products 32 when the columnated jets of gas impinge thereon. Thus, where the temperature of the recirculating gas is greater than the temperature at the surface of the food product, thermal energy is imparted to the food product by the impinging gas. Conversely, where the temperature of the recirculating gas is less than the temperature at the surface of the food product, thermal energy is imparted by the food product to the impinging gas. Therefore, depending upon the relative thermal energy levels of the food product and the impinging gas, the apparatus of the invention can be utilized to either heat or cool the food products that are transported through it by conveyor 30. Although apparatus for controlling the temperature of the recirculating gas is not shown in FIG. 1, it will be readily understood by those of ordinary skill in the art upon reading the present disclosure that many conventional devices are commercially available for achieving this purpose. Thus, for example, electrical resistance heating elements, hot air blowers, or the like can be utilized inside cabinet 12 so as to provide additional thermal energy to the "spent" gas that is recirculated behind plenum 20 to blower 38. Similarly, where cooling is desired, numerous conventional refrigeration devices are available for removing thermal energy from the recirculating gas. In either case, the thermal energy level of the recirculating gas can be conveniently monitored or controlled through the use of conventional thermometers, thermocouples, and the like. Depending upon the ambient temperature and the temperature of the food products, ambient air can sometimes be used for heating or cooling and then vented to the atmosphere without the need for other heating or refrigeration means.

Other and further embodiments and modifications of the present invention will become apparent to those of ordinary skill in the art upon reading the present disclosure, and it is intended to cover all such modifications as fall within the scope of the appended claims.

What is claimed is:

1. Apparatus for controlling the flow of a temperature-controlled gas to the surface of a food product, said apparatus comprising a cabinet; at least one thermal treatment zone disposed within said cabinet; means for supporting said food product within said thermal treatment zone; columnating means extending transversely across said thermal treatment zone adapted to receive a temperature-controlled gas and thereafter direct a plurality of columnated jets of said gas against a surface of said food product; duct means communicating with said columnating means adapted to receive said gas from a plenum means and thereafter discharge said gas into said columnating means; plenum means communicating with said duct means and adapted to direct a flow of said gas into said duct means, said plenum means comprising a back wall adapted to receive a pressurized flow of said gas into said plenum means, and further comprising a front wall, said front wall comprising elongated plenum outlet ports disposed adjacent to the top and bottom edges of said front wall, said plenum outlet ports being adapted to provide fluid communication between said plenum means and said duct means, said front wall of said plenum means further comprising upper and lower inclined front wall sections and proximal and distal side inclined front wall sections, said inclined front wall sections being adapted to direct said gas away from said back wall and through said plenum outlet ports.

2. The apparatus of claim 1 wherein said plenum means further comprises a top wall that extends from the top of said back wall to the top of said front wall, and is upwardly inclined between said back wall and said front wall.

3. The apparatus of claim 1 wherein said plenum means further comprises a bottom wall that extends from the bottom edge of said back wall to the bottom edge of said front wall and is downwardly inclined between said back wall and said front wall.

4. The apparatus of claim 1 wherein said duct means further comprises elongated, substantially continuous manifold means adapted to receive said gas from one of said plenum outlet ports.

5. The apparatus of claim 1 wherein said duct means further comprises at least two inwardly inclined walls adapted to substantially evenly distribute the flow of said gas through said columnating means, at least one of said inwardly inclined walls being a side wall.

6. The apparatus of claim 1 wherein said back wall of said plenum means further comprises a shroud adapted to receive an impeller means for discharging said temperature-controlled gas into said plenum means.

7. The apparatus of claim 6 wherein said upper and lower inclined front wall sections intersect opposite said impeller means.

8. The apparatus of claim 1 wherein said inclined front wall sections coact to direct the flow of said gas outwardly in all directions from the midpoint of said front wall, thus providing substantially even flow distribution into each of said plenum outlet ports.

9. A duct assembly for use in an apparatus for thermally treating food products by means of impinging jets of a temperature-controlled gas, said duct assembly comprising an elongated, substantially rectangular manifold, a duct means comprising end wall portions perpendicular to and outwardly extending from said manifold means, said end walls having one substantially horizontal edge and one inwardly inclined edge, and at least one inwardly inclined wall connected to and extending between the inwardly inclined edges of said walls, said duct means adapted to provide fluid communication between said manifold means and a plurality of columnating assemblies disposed adjacent thereto, said columnating assemblies being maintained in sliding engagement with said duct means by flanges disposed on the horizontal edges of said end walls and on a plurality of substantially horizontal flange support members extending perpendicularly outward from the top wall of said manifold means to the outside edge of said inclined wall of said duct means between said end walls of said duct means.

* * * * *